United States Patent
Shpunt et al.

(10) Patent No.: US 10,247,812 B2
(45) Date of Patent: *Apr. 2, 2019

(54) MULTI-MIRROR SCANNING DEPTH ENGINE

(71) Applicant: APPLE INC., Cupertino, CA (US)

(72) Inventors: Alexander Shpunt, Portola Valley, CA (US); Yuval Gerson, Sunnyvale, CA (US); Naftali Chayat, Kfar Saba (IL); Noel Axelrod, Jerusalem (IL)

(73) Assignee: APPLE INC., Cupertino, CA (US)

( * ) Notice: Subject to any disclaimer, the term of this patent is extended or adjusted under 35 U.S.C. 154(b) by 112 days.

This patent is subject to a terminal disclaimer.

(21) Appl. No.: 15/385,883

(22) Filed: Dec. 21, 2016

(65) Prior Publication Data

US 2017/0097407 A1 Apr. 6, 2017

Related U.S. Application Data

(63) Continuation-in-part of application No. 14/599,507, filed on Jan. 18, 2015, now Pat. No. 9,715,107, and a
(Continued)

(51) Int. Cl.
*G01S 17/10* (2006.01)
*G01S 17/89* (2006.01)
(Continued)

(52) U.S. Cl.
CPC .......... *G01S 7/4817* (2013.01); *G01S 17/10* (2013.01); *G01S 17/89* (2013.01); *G02B 26/101* (2013.01); *G02B 26/105* (2013.01)

(58) Field of Classification Search
CPC ...... G01S 7/481; G01S 7/4811; G01S 7/4812; G01S 7/4813; G01S 7/4817; G01S 17/10; G01S 17/89; G02B 26/105; G02B 26/101
See application file for complete search history.

(56) References Cited

U.S. PATENT DOCUMENTS

| 5,608,468 A | 3/1997 | Gove |
| 5,635,708 A * | 6/1997 | Obata ............... G02B 26/0833 |
| | | 235/462.45 |

(Continued)

FOREIGN PATENT DOCUMENTS

| EP | 1953583 A2 | 8/2008 |
| JP | 2012242477 A | 12/2012 |
| WO | 2013045699 A1 | 4/2013 |

OTHER PUBLICATIONS

U.S. Appl. No. 15/622,111 office action dated Feb. 9, 2018.
(Continued)

*Primary Examiner* — Kimberly N. Kakalec
(74) *Attorney, Agent, or Firm* — Kligler & Associates

(57) ABSTRACT

A scanning device includes a scanner, which includes a base and a gimbal, mounted within the base so as to rotate relative to the base about a first axis of rotation. A transmit mirror and at least one receive mirror are mounted within the gimbal so as to rotate in mutual synchronization about respective second axes, which are parallel to one another and perpendicular to the first axis. A transmitter emits a beam including pulses of light toward the transmit mirror, which reflects the beam so that the scanner scans the beam over a scene. A receiver receives, by reflection from the at least one receive mirror, the light reflected from the scene and generates an output indicative of the time of flight of the pulses to and from points in the scene.

20 Claims, 3 Drawing Sheets

Related U.S. Application Data continuation-in-part of application No. 14/551,104, filed on Nov. 24, 2014, now abandoned, said application No. 14/599,507 is a continuation-in-part of application No. 13/798,251, filed on Mar. 13, 2013, now Pat. No. 9,435,638.

(60) Provisional application No. 61/929,071, filed on Jan. 19, 2014, provisional application No. 61/614,018, filed on Mar. 22, 2012.

(51) Int. Cl.
  *G01S 7/481* (2006.01)
  *G02B 26/10* (2006.01)

(56) References Cited

U.S. PATENT DOCUMENTS

| | | | |
|---|---|---|---|
| 5,847,859 | A | 12/1998 | Murata et al. |
| 6,540,361 | B1 | 4/2003 | Hayashi et al. |
| 6,753,638 | B2 | 6/2004 | Adams et al. |
| 9,462,255 | B1 | 10/2016 | Marason et al. |
| 9,784,838 | B1 * | 10/2017 | Shpunt .................... G01S 17/89 |
| 9,835,853 | B1 * | 12/2017 | Shpunt ................ G02B 26/105 |
| 2003/0137711 | A1 | 7/2003 | Yagi |
| 2005/0046504 | A1 | 3/2005 | Xiaoyu et al. |
| 2005/0078169 | A1 | 4/2005 | Turner |
| 2008/0278785 | A1 | 11/2008 | Klose et al. |
| 2009/0002678 | A1 | 1/2009 | Tanaka et al. |
| 2010/0046052 | A1 | 2/2010 | Mizoguchi et al. |
| 2010/0253989 | A1 | 10/2010 | Shimizu |
| 2014/0078514 | A1 | 3/2014 | Zhu |
| 2014/0226145 | A1 | 8/2014 | Steffey |
| 2014/0253994 | A1 | 9/2014 | Benner, Jr. |

OTHER PUBLICATIONS

International Application PCT/US2017/039165 Search Report dated Oct. 4, 2017.
U.S. Appl. No. 14/975,871 Office Action dated Jan. 13, 2017.
U.S. Appl. No. 14/559,507 Office Action dated Mar. 8, 2017.
U.S. Appl. No. 14/554,086 Office Action dated Mar. 10, 2017.
U.S. Appl. No. 14/554,078 Office Action dated May 31, 2017.
CN Application # 201580005002.2 office action dated Jun. 12, 2018.
U.S. Appl. No. 15/622,111 office action dated Jul. 12, 2018.
CN Application # 201580060948.9 office action dated Nov. 28, 2018.

* cited by examiner

MULTI-MIRROR SCANNING DEPTH ENGINE

CROSS-REFERENCE TO RELATED APPLICATIONS

This patent application is a continuation-in-part of U.S. patent application Ser. No. 14/551,104, filed Nov. 24, 2014. This application is also a continuation-in-part of U.S. patent application Ser. No. 14/599,507, filed Jan. 18, 2015, which claims the benefit of U.S. Provisional Patent Application 61/929,071, filed Jan. 19, 2014, and is a continuation-in-part of U.S. patent application Ser. No. 13/798,251 (now U.S. Pat. No. 9,435,638), filed Mar. 13, 2013, which claims the benefit of U.S. Provisional Patent Application 61/614,018, filed Mar. 22, 2012. The disclosures of all of the above related applications are incorporated herein by reference.

FIELD OF THE INVENTION

The present invention relates generally to methods and devices for projection and capture of optical radiation, and particularly to compact optical scanners.

BACKGROUND

Various methods are known in the art for optical 3D mapping, i.e., generating a 3D profile of the surface of an object by processing an optical image of the object. This sort of 3D profile is also referred to as a 3D map, depth map or depth image, and 3D mapping is also referred to as depth mapping.

Some methods of 3D mapping use time-of-flight sensing. For example, U.S. Patent Application Publication 2013/0207970, whose disclosure is incorporated herein by reference, describes a scanning depth engine, which includes a transmitter, which emits a beam comprising pulses of light, and a scanner, which is configured to scan the beam, within a predefined scan range, over a scene. The scanner may comprise a micromirror produced using microelectromechanical system (MEMS) technology. A receiver receives the light reflected from the scene and generates an output indicative of the time of flight of the pulses to and from points in the scene. A processor is coupled to control the scanner and to process the output of the receiver so as to generate a 3D map of the scene.

Another time-of-flight scanner using MEMS technology is the Lamda scanner module produced by the Fraunhofer Institute for Photonic Microsystems IPMS (Dresden, Germany). The Lamda module is constructed based on a segmented MEMS scanner device consisting of identical scanning mirror elements. A single scanning mirror of the collimated transmit beam oscillates parallel to a segmented scanning mirror device of the receiver optics.

PCT International Publication WO 2014/016794, whose disclosure is incorporated herein by reference, describes optical scanners with enhanced performance and capabilities. In a disclosed embodiment, optical apparatus includes a stator assembly, which includes a core containing an air gap and one or more coils including conductive wire wound on the core so as to cause the core to form a magnetic circuit through the air gap in response to an electrical current flowing in the conductive wire. A scanning mirror assembly includes a support structure, a base, which is mounted to rotate about a first axis relative to the support structure, and a mirror, which is mounted to rotate about a second axis relative to the base. At least one rotor includes one or more permanent magnets, which are fixed to the scanning mirror assembly and which are positioned in the air gap so as to move in response to the magnetic circuit. A driver is coupled to generate the electrical current in the one or more coils at one or more frequencies selected so that motion of the at least one rotor, in response to the magnetic circuit, causes the base to rotate about the first axis at a first frequency while causing the mirror to rotate about the second axis at a second frequency.

U.S. Patent Application Publication 2014/0153001, whose disclosure is incorporated herein by reference, describes an optical scanning device that includes a substrate, which is etched to define an array of two or more parallel micromirrors and a support surrounding the micromirrors. Respective spindles connect the micromirrors to the support, thereby defining respective parallel axes of rotation of the micromirrors relative to the support. One or more flexible coupling members are connected to the micromirrors so as to synchronize an oscillation of the micromirrors about the respective axes.

U.S. Pat. No. 7,952,781, whose disclosure is incorporated herein by reference, describes a method of scanning a light beam and a method of manufacturing a microelectromechanical system (MEMS), which can be incorporated in a scanning device. In a disclosed embodiment, a rotor assembly having at least one micromirror is formed with a permanent magnetic material mounted thereon, and a stator assembly has an arrangement of coils for applying a predetermined moment on the at least one micromirror.

SUMMARY

Embodiments of the present invention provide improved devices and methods for synchronized scanning of transmitted and received radiation.

There is therefore provided, in accordance with an embodiment of the present invention, a scanning device, including a scanner, which includes a base and a gimbal, mounted within the base so as to rotate relative to the base about a first axis of rotation. A transmit mirror and at least one receive mirror are mounted within the gimbal so as to rotate in mutual synchronization about respective second axes, which are parallel to one another and perpendicular to the first axis. A transmitter is configured to emit a beam including pulses of light toward the transmit mirror, which reflects the beam so that the scanner scans the beam over a scene. A receiver is configured to receive, by reflection from the at least one receive mirror, the light reflected from the scene and to generate an output indicative of the time of flight of the pulses to and from points in the scene.

In a disclosed embodiment, the scanner includes a substrate, which is etched to define the base, the gimbal, and the transmit and receive mirrors in a microelectromechanical systems (MEMS) process.

In some embodiments, the transmit and receive mirrors are connected to the gimbal by respective hinges disposed along the respective second axes and configured so that the transmit and receive mirrors rotate about the respective hinges by oscillation at respective resonant frequencies, and the transmit and receive mirrors are coupled together so as to synchronize the oscillation. The gimbal may be driven to rotate relative to the base in a non-resonant mode. Typically, rotations of the transmit and receive mirrors are synchronized in frequency, phase and amplitude.

In one embodiment, the at least one receive mirror includes two or more receive mirrors mounted in the gimbal with the transmit mirror, and the receiver is configured to receive the light reflected from the scene by reflection from all of the two or more receive mirrors.

In some embodiments, the scanner is configured to scan the light over a predefined angular range, and the device includes a reflector, which is positioned so as to reflect the light emitted by the transmitter onto the transmit mirror and to reflect the light reflected from the scene from the at least one receive mirror to the receiver at reflection angles that are outside the predefined angular range. The transmitter is configured to emit the light within a predefined wavelength range, and the reflector includes, in one embodiment, an interference filter, which is positioned between the scanner and the scene and is configured to pass the light within the predefined wavelength range that is incident on the interference filter at angles within the predefined angular range, while reflecting the light within the predefined wavelength range that is incident on the interference filter outside the predefined angular range. Typically the transmit mirror and the at least one receive mirror are spaced sufficiently far apart so that specular reflections of the emitted beam by the reflector do not fall within a field of view of the receiver.

In a disclosed embodiment, the device includes a collimating lens, which is positioned between the transmitter and the scanner and is configured to collimate the light emitted by the transmitter. A collection lens is positioned between the scanner and the receiver and is configured to focus the reflected light onto the receiver. In one embodiment, the transmitter includes a laser diode, and the receiver includes an avalanche photodiode.

There is also provided, in accordance with an embodiment of the present invention, a method for scanning, which includes providing a scanner, which includes a base, a gimbal, mounted within the base so as to rotate relative to the base about a first axis of rotation, and a transmit mirror and at least one receive mirror, mounted within the gimbal so as to rotate in mutual synchronization about respective second axes, which are parallel to one another and perpendicular to the first axis. A beam including pulses of light is directed toward the transmit mirror, which reflects the beam so that the scanner scans the beam over a scene. The light reflected from the scene is received by reflection from the at least one receive mirror, and an output is generated, which is indicative of the time of flight of the pulses to and from points in the scene.

In one embodiment, the method includes processing the output in order to generate a three-dimensional (3D) map of the scene based on the time of flight of the pulses.

The present invention will be more fully understood from the following detailed description of the embodiments thereof, taken together with the drawings in which:

DETAILED DESCRIPTION OF EMBODIMENTS

Embodiments of the present invention that are described herein provide a scanning device with separate, synchronized scanning mirrors for the transmit and receive channels. The mirrors may advantageously be produced as a compact, coupled array on a single gimbal, using a MEMS process.

In the disclosed embodiments, the scanning device comprises a scanner, which includes a gimbal mounted within a base so as to rotate relative to the base about a first axis of rotation. A transmit mirror and at least one receive mirror are mounted within the gimbal and rotate in mutual synchronization about respective axes, which are parallel to one another and perpendicular to the first axis of the gimbal. A transmitter emits a beam comprising pulses of light toward the transmit mirror, which reflects the beam so that the scanner scans the beam over a scene. A receiver receives the light reflected from the scene, by reflection from the receive mirror (or mirrors), and generates an output indicative of the time of flight of the pulses to and from points in the scene. This output may be processed, for example, in order to generate a 3D map of the scene.

This novel design, with closely-coupled transmit and receive mirrors on the same gimbal, is advantageous in producing compact scanning devices, of reduced size and complexity relative to devices that are known in the art. Because the optical transmit and receive channels are parallel but separate, there is no need for a beamsplitter to combine the channels, thus reducing component count and avoiding the loss of received light that inevitably occurs at the beamsplitter. Separation of the transmit and receive channels is also useful in reducing the amount of stray light that reaches the receiver due to specular reflections of the transmitted beam within the scanning device.

Figure 1:
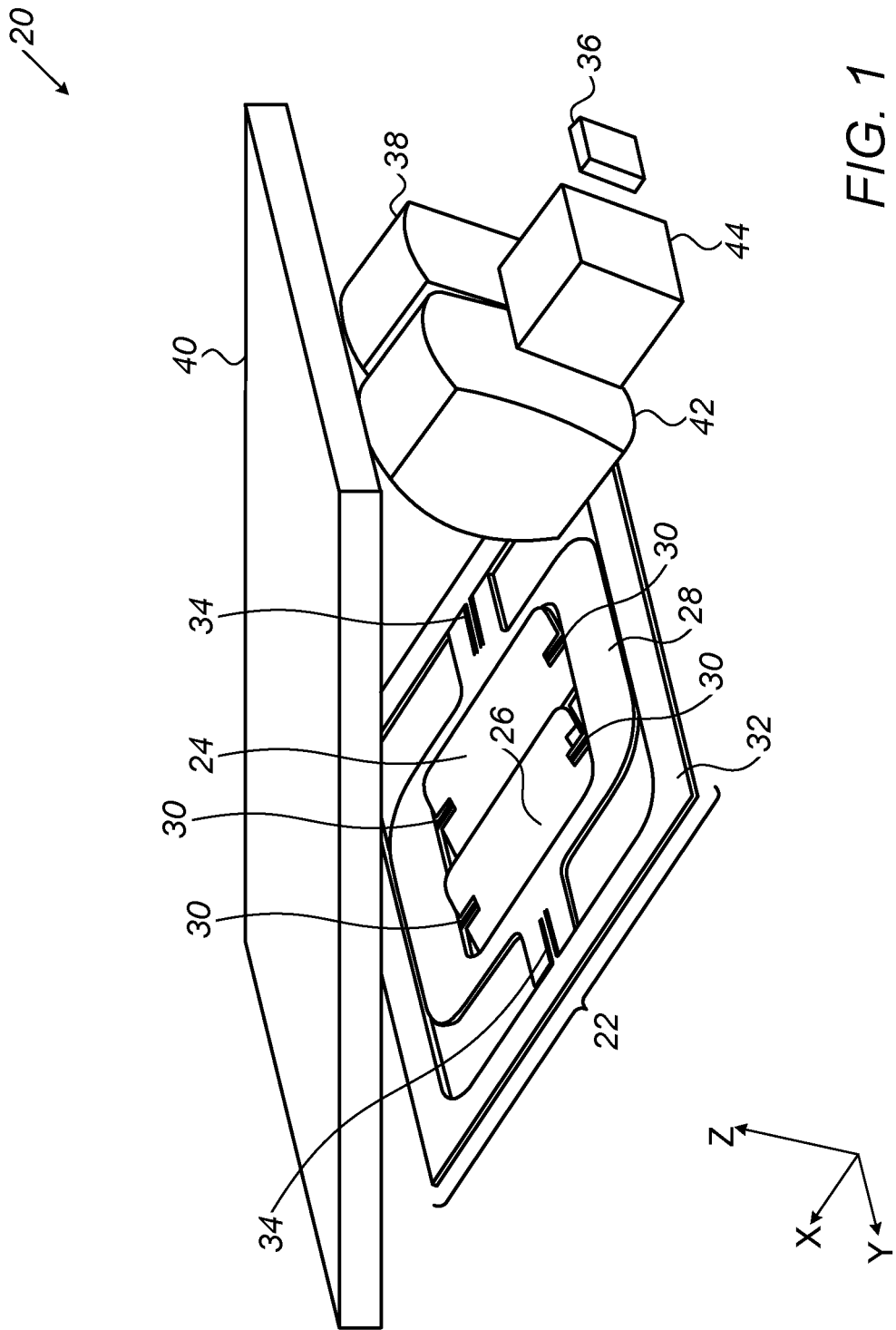
FIG. 1 is a schematic, pictorial illustration of an optical scanning device, in accordance with an embodiment of the present invention.
Figure 2A:
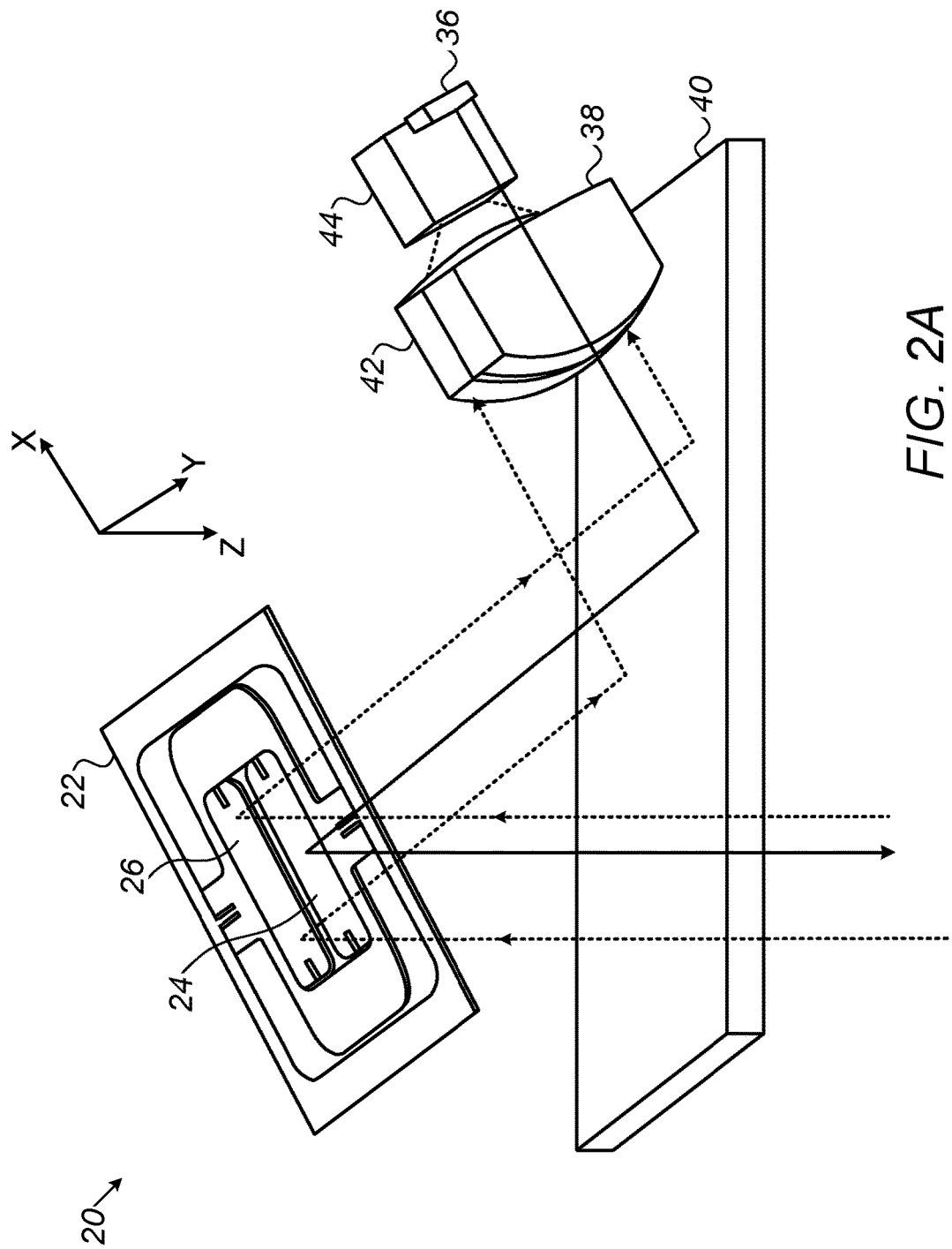
FIG. 2A is a schematic, pictorial illustration of the optical scanning device of FIG. 1, showing the paths of transmitted and received beams in the device in accordance with an embodiment of the present invention.
Figure 2B:
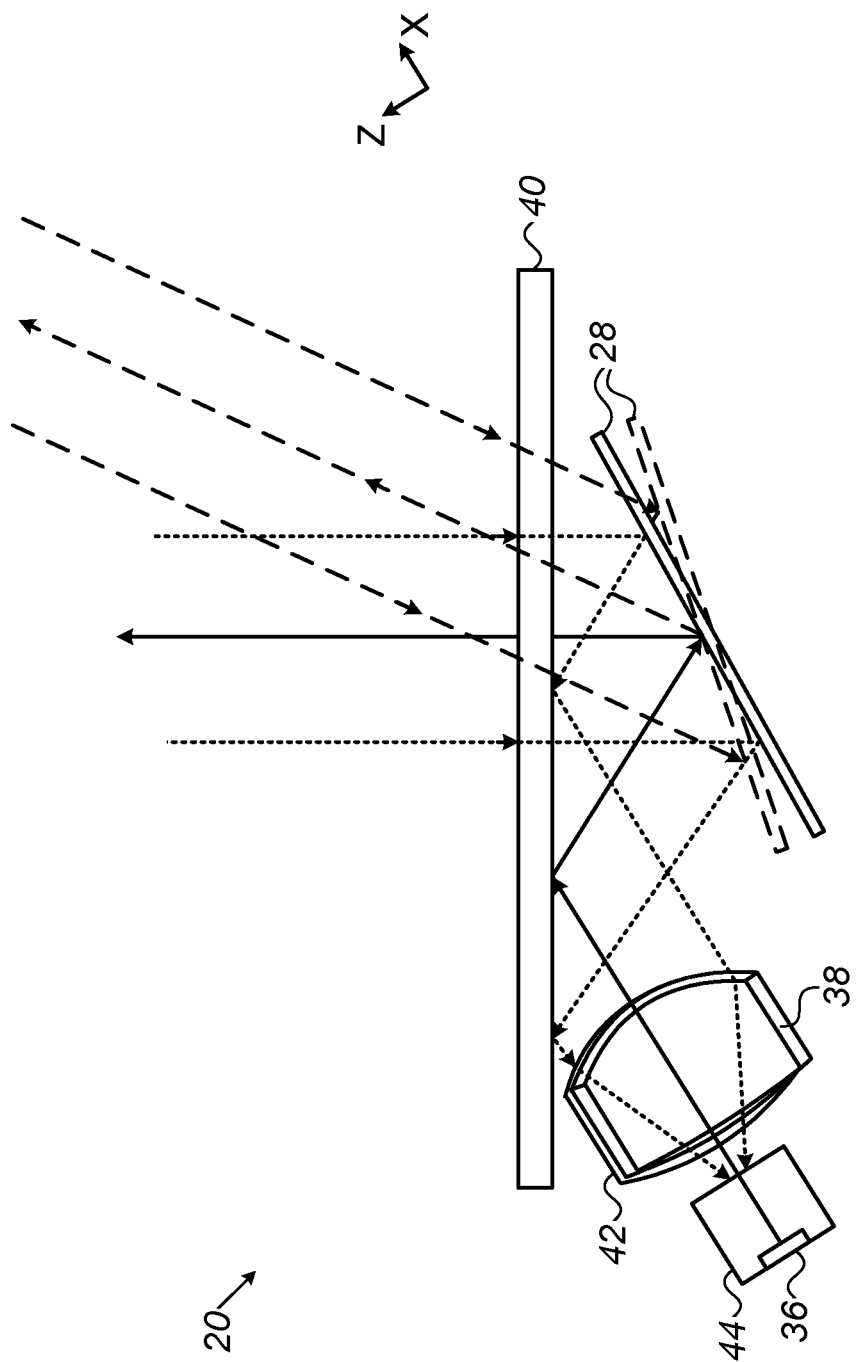
FIG. 2B is a schematic side view of the optical scanning device of FIG. 1, showing the paths of transmitted and received beams in the device in accordance with an embodiment of the present invention.

Reference is now made to FIGS. 1, 2A and 2B, which schematically illustrate an optical scanning device 20, in accordance with an embodiment of the present invention. FIG. 1 presents a pictorial overview of device 20, while FIGS. 2A and 2B are pictorial and side views, respectively, showing optical beam paths within the device. Device 20 can be particularly useful as a part of a 3D mapping system or other depth-sensing (LIDAR) device, in conjunction with a suitable processor, scan driver, and mechanical packaging, as are known in the art. (These components are omitted from the figures, however, for the sake of simplicity.) Alternatively, device 20 may be adapted for use as a scanning optical transceiver in other applications, such as free-space optical communications over a wide-angle optical link.

Scanning device 20 is built around a scanner 22, comprising an adjacent transmit mirror 24 and receive mirror 26, which are mounted together within a gimbal 28. Although only a single receive mirror is shown here, in alternative embodiments (not shown in the figures), two or more receive mirrors may be mounted side-by-side in gimbal 28, parallel to transmit mirror 24. The use of multiple, synchronized receive mirrors in this manner is advantageous in enlarging the effective aperture of the receiver, while maintaining the small size and hence low inertia of the individual mirrors. Typically, for portable applications, the area of each micromirror in device 20 is in the range of 2.5 to 50 $mm^2$, and the overall area of scanner 22 is on the order of 1 $cm^2$. Alternatively, larger or even smaller scanners of this sort may be produced, depending on application requirements.

Mirrors 24 and 26 rotate about respective hinges 30 relative to gimbal 28, while gimbal 28 rotates about hinges 34 relative to a base 32. Hinges 30 (and hence the axes of rotation of mirrors 24 and 26) are parallel to one another, along the X-axis in the figures. Hinges 34 are oriented so that the axis of rotation of gimbal 28, shown as being oriented along the Y-axis, is perpendicular to the mirror axes. As noted earlier, scanner 22 may be made from a substrate, such as a semiconductor wafer, which is etched to define base 32, gimbal 28, and transmit and receive mirrors 24, 26 in a MEMS process. (A reflective coating is deposited on the mirrors as a part of the process.) Gimbal 28 and mirrors 24 and 26 may be driven to rotate about their respective axes by any suitable sort of drive, such as the magnetic drives described in the references cited above in the Background section, or other types of magnetic and electrical scanner drives that are known in the art.

The dimensions and masses of transmit and receive mirrors 24 and 26 and hinges 30 may desirably be chosen so that the mirrors rotate about their respective hinges by oscillation at respective resonant frequencies. Although these resonant frequencies may be slightly different, due to manufacturing tolerances, the transmit and receive mirrors are coupled together, as described below, so as to synchronize their oscillations. Typically, this coupling synchronizes the rotations of the transmit and receive mirrors in frequency, phase and amplitude. On the other hand, gimbal 28 may be driven to rotate relative to base 32 in a non-resonant mode, typically at a frequency substantially lower than the resonant frequency of mirrors 24 and 26. The fast rotation of mirrors 24 and 26 about the X-axis and the slower rotation of gimbal 28 about the Y-axis may be coordinated so as to define a raster scan of the transmitted and received beams over an area of interest. Alternatively, the rotations of mirrors 24, 26 and gimbal 28 may be controlled to generate scan patterns of other sorts.

Various types of links may be used to couple the rotations of mirrors 24 and 26. For example, the mirrors may be coupled together by a mechanical link in contact with the mirrors, as described in the above-mentioned U.S. Patent Application Publication 2014/0153001. Alternatively or additionally, the mirrors may be coupled together by a link exerted by electromagnetic force, which may operate without mechanical contact between the mirrors, as described, for example, in U.S. Provisional Patent Application 61/929, 071, filed Jan. 19, 2014, whose disclosure is incorporated herein by reference. Typically, a weak coupling force is sufficient to engender the desired synchronization, particularly when the mirrors are driven to scan at or near their resonant frequencies of rotation.

A transmitter 36 emits pulses of light, which are collimated by a collimating lens 38 and directed by a selective reflector 40 toward transmit mirror 24. (The term "light," in the context of the present description and in the claims, refers to optical radiation of any wavelength, including visible, infrared, and ultraviolet radiation.) Light reflected back from the scene is directed by receive mirror 26 toward reflector 40, and from reflector 40 to a collection lens 42, which focuses the reflected light onto a receiver 44. In alternative optical layouts (not shown in the figures), light reflected back from the scene may be directed by receive mirror 26 toward a collection lens, without reflection from reflector 40. Additionally or alternatively, reflector 40 may be eliminated from the transmit path, as well.

Receiver 44 typically comprises a high-speed optoelectronic detector. In one embodiment, transmitter comprises a pulsed laser diode, while receiver 44 comprises an avalanche photodiode, but any other suitable sorts of emitting and sensing components may alternatively be used in device 20.

The distance between mirrors 24 and 26 is chosen so as to enable placement of transmit and receive optics in the respective beam paths, and to eliminate specular reflections of the transmitted beam within the scanning device. In particular the mirrors are spaced sufficiently far apart so that specular reflections by reflector 40 of the beam emitted by transmitter 36 do not fall within a field of view of receiver 44. Specifically, in the present embodiment, to prevent direct passage of transmitted light from transmit mirror to receive mirror 26 via reflector 40, the distance between the mirrors should be larger than the lateral travel of the transmit beam on such a path when the normal to reflector 40 is within the instantaneous field of view of the receive channel. For example, if the distance between mirrors 24, 26 and reflector 40 is 7 mm, and the field of view of receive channel is cone with a half-angle of 3°, then the distance between the mirrors should be greater than 2*sin(3°)*7 mm=0.73 mm. Otherwise, receiver 44 will be blinded by specular reflection.

Scanner 22 scans the transmitted and received beams of light together over a predefined angular range, so that at each point in the scan, receiver 44 receives light from the same area of the scene that is illuminated at that point by transmitter 36. FIG. 2B shows the transmitted and received beam angles, by way of example, at two different rotation angles of gimbal 28 within the angular scan range. Reflector 40 is configured and positioned so as to selectively reflect the light emitted by transmitter 36 onto transmit mirror 24 at reflection angles that are outside the angular range of the scan, and similarly to reflect the light reflected from the scene from receive mirror 26 to receiver 44 at such angles. On the other hand, as shown in FIGS. 2A and 2B, reflector 40 selectively transmits light within the predefined angular scan range between mirrors 24, 26 and the scene being scanned (although as noted earlier, in some alternative embodiments, reflector 40 is not present in the transmit channel or the receive channel, or both).

In order to achieve this sort of angular selectivity, reflector 40 may comprise an interference filter, typically in the form of a coating on the reflector surface, which is designed to operate with the predefined wavelength range of the light that is emitted by transmitter 36. The wavelength response of such an interference filter changes as a function of the angle of incidence of light rays on the filter, wherein typically the spectral transmission band of the filter shifts toward shorter wavelengths as the angle of incidence increases. This angle-dependent behavior, and its use in achieving the sort of angular selectivity that characterizes reflector 40, is described further in U.S. Provisional Patent Application 61/940,439, filed Feb. 16, 2014, which is incorporated herein by reference.

The interference filter coating on reflector 40 is thus designed to pass the light, within the predefined wavelength range of transmitter 36, that is incident on the reflector at angles within the predefined angular scan range of scanner 22, such as the light passing between mirrors 24, 26 and the scene being scanned. Meanwhile, the interference filter coating reflects the light within the predefined wavelength range that is incident on reflector 40 outside the predefined angular scan range, such as the light passing between transmitter 36 and mirror 24 and between mirror 26 and receiver 44.

The interference filter coating thus enables reflector 40 to serve both as a turning mirror for the light that is directed toward it at a high angle, and as a bandpass filter for the same beam of light when scanned through the interference filter coating in a lower range of angles. Reflector 40 thus provides the added benefit of reducing the transmission of undesired stray light outside the wavelength range of interest from the scene back to receiver 44. This dual use of reflector 40—as both a turning mirror and a bandpass filter—facilitates the compact design of scanning device 20 and reduces its component count relative to devices that are known in the art.

Although the figures described above show a particular optical design and layout of the components of scanning device 20, the principles of the present invention may be applied in scanning devices of other designs. For example, scanner 22 may comprise mirrors and gimbals of different shapes, sizes, orientations and spacing from those shown in the figures, and may further comprise two or more parallel receive mirrors, as noted above. As another example, transmitter 36 and receiver 44 may be positioned to transmit and receive light to and from scanner 22 directly, without intervening reflector 40. Alternative designs based on the principles set forth above will be apparent to those skilled in the art and are also considered to be within the scope of the present invention.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A scanning device, comprising:
   a scanner, which comprises:
      a base;
      a gimbal, mounted within the base so as to rotate relative to the base about a first axis of rotation; and
      a transmit mirror and at least one receive mirror, mounted within the gimbal so as to rotate in mutual synchronization about respective second axes, which are parallel to one another and perpendicular to the first axis;
   a transmitter, which is configured to emit a beam comprising pulses of light toward the transmit mirror, which reflects the beam so that the scanner scans the beam over a scene; and
   a receiver, which is configured to receive, by reflection from the at least one receive mirror, the light reflected from the scene and to generate an output indicative of the time of flight of the pulses to and from points in the scene.

2. The device according to claim 1, wherein the scanner comprises a substrate, which is etched to define the base, the gimbal, and the transmit and receive mirrors in a microelectromechanical systems (MEMS) process.

3. The device according to claim 1, wherein the transmit and receive mirrors are connected to the gimbal by respective hinges disposed along the respective second axes and configured so that the transmit and receive mirrors rotate about the respective hinges by oscillation at respective resonant frequencies, and wherein the transmit and receive mirrors are coupled together so as to synchronize the oscillation.

4. The device according to claim 3, wherein the gimbal is driven to rotate relative to the base in a non-resonant mode.

5. The device according to claim 3, wherein rotations of the transmit and receive mirrors are synchronized in frequency, phase and amplitude.

6. The device according to claim 1, wherein the at least one receive mirror comprises two or more receive mirrors mounted in the gimbal with the transmit mirror, and wherein the receiver is configured to receive the light reflected from the scene by reflection from all of the two or more receive mirrors.

7. The device according to claim 1, wherein the scanner is configured to scan the light over a predefined angular range, and
   wherein the device comprises a reflector, which is positioned so as to reflect the light emitted by the transmitter onto the transmit mirror and to reflect the light reflected from the scene from the at least one receive mirror to the receiver at reflection angles that are outside the predefined angular range.

8. The device according to claim 7, wherein the transmitter is configured to emit the light within a predefined wavelength range, and
   wherein the reflector comprises an interference filter, which is positioned between the scanner and the scene and is configured to pass the light within the predefined wavelength range that is incident on the interference filter at angles within the predefined angular range, while reflecting the light within the predefined wavelength range that is incident on the interference filter outside the predefined angular range.

9. The device according to claim 7, wherein the transmit mirror and the at least one receive mirror are spaced sufficiently far apart so that specular reflections of the emitted beam by the reflector do not fall within a field of view of the receiver.

10. The device according to claim 1, and comprising:
    a collimating lens, which is positioned between the transmitter and the scanner and is configured to collimate the light emitted by the transmitter; and
    a collection lens, which is positioned between the scanner and the receiver and is configured to focus the reflected light onto the receiver.

11. The device according to claim 1, wherein the transmitter comprises a laser diode, and the receiver comprises an avalanche photodiode.

12. A method for scanning, comprising:
    providing a scanner, which comprises:
       a base;
       a gimbal, mounted within the base so as to rotate relative to the base about a first axis of rotation; and
       a transmit mirror and at least one receive mirror, mounted within the gimbal so as to rotate in mutual synchronization about respective second axes, which are parallel to one another and perpendicular to the first axis;
    directing a beam comprising pulses of light toward the transmit mirror, which reflects the beam so that the scanner scans the beam over a scene; and
    receiving, by reflection from the at least one receive mirror, the light reflected from the scene and generating an output indicative of the time of flight of the pulses to and from points in the scene.

13. The method according to claim 12, wherein providing the scanner comprises etching a substrate to define the base, the gimbal, and the transmit and receive mirrors in a microelectromechanical systems (MEMS) process.

14. The method according to claim 12, wherein providing the scanner comprises connecting the transmit and receive mirrors to the gimbal by respective hinges disposed along the respective second axes and configured so that the transmit and receive mirrors rotate about the respective hinges by oscillation at respective resonant frequencies, and coupling the transmit and receive mirrors together so as to synchronize the oscillation.

15. The method according to claim 14, wherein providing the scanner comprises driving the gimbal to rotate relative to the base in a non-resonant mode.

16. The method according to claim 14, wherein coupling the transmit and receive mirrors together comprises synchronizing rotations of the transmit and receive mirrors in frequency, phase and amplitude.

17. The method according to claim 12, wherein providing the scanner comprises mounting two or more receive mirrors in the gimbal together with the transmit mirror, wherein the light reflected from the scene is received by reflection from all of the two or more receive mirrors.

18. The method according to claim 12, wherein providing the scanner comprises scanning the light over a predefined angular range, and
    wherein the method comprises positioning a reflector so as to reflect the beam onto the transmit mirror and to reflect the light reflected from the scene from the at least one receive mirror at reflection angles that are outside the predefined angular range.

19. The method according to claim 18, wherein the beam comprises light within a predefined wavelength range, and
    wherein the reflector comprises an interference filter, which is positioned between the scanner and the scene and is configured to pass the light within the predefined wavelength range that is incident on the interference filter at angles within the predefined angular range, while reflecting the light within the predefined wavelength range that is incident on the interference filter outside the predefined angular range.

20. The method according to claim 12, and comprising processing the output in order to generate a three-dimensional (3D) map of the scene based on the time of flight of the pulses.

\* \* \* \* \*